United States Patent

[11] 3,559,706

| [72] | Inventors | Lucas Jones Conrad;<br>Cyrus Alfred Alldred, Jr., Winston-Salem, N.C. |
|---|---|---|
| [21] | Appl. No. | 759,709 |
| [22] | Filed | Sept. 13, 1968 |
| [45] | Patented | Feb. 2, 1971 |
| [73] | Assignee | R. J. Reynolds Tobacco Co.<br>Winston-Salem, N.C.<br>a corporation of New Jersey |

[54] APPARATUS FOR DISUNITING MEAT AND BONES AND CARRIAGE SUPPORT THEREFOR
8 Claims, 8 Drawing Figs.

[52] U.S. Cl. .................................................. 146/76, 17/1
[51] Int. Cl. ................................................ B02b 7/04, A01f 31/00
[50] Field of Search .......................................... 17/1.5; 146/76, 76.1, 182, 192, 1, 8, 297, 67, 49

[56] References Cited
UNITED STATES PATENTS

| 1,388,026 | 8/1921 | Conner | 146/76(.1)X |
| 1,434,816 | 11/1922 | Greene | 146/76(.1)X |
| 2,569,156 | 9/1951 | Dybvig | 146/76 |
| 3,256,555 | 6/1966 | Paoli | 17/1(.5) |
| 3,347,295 | 10/1967 | Feiling | 146/8 |
| 3,472,300 | 10/1969 | Conrad | 146/76X |

*Primary Examiner*—Willie G. Abercrombie
*Attorneys*—Robert S. Dunham, P. E. Henninger, Lester W. Clark, Gerald W. Griffin, Thomas F. Moran, Howard J. Churchill, R. Bradlee Boal, Christopher C. Dunham and Thomas P. Dowd ABSTRACT: A food processing apparatus for disuniting soft edible material from harder inedible portions in appropriate foodstuffs comprising a horizontal rotating disc with a ribbed surface which cooperates with a series of tines arranged in radially extending curves above the surface in a pinwheel formation to disunite the component food parts which are introduced from above. The disc drive means is supported above the disuniting section and the entire apparatus is cantilevered on a support carriage permitting ready accessibility, adjustment and dismantling of the various members for operating and cleaning.

INVENTORS
LUCAS J. CONRAD
CYRUS A. ALLDRED, JR
BY Lester N. Clark
ATTORNEY

APPARATUS FOR DISUNITING MEAT AND BONES AND CARRIAGE SUPPORT THEREFOR

CROSS-REFERENCES

This application is directed to particular features of a food processing system, other features of which are covered in the copending applications of Conrad and Everhart, Ser. No. 761,179 filed Sept. 20, 1968 now U.S. Pat. No. 3,508,646; Conrad et al., Ser. No. 761,029 filed Sept. 20, 1968; and Lucas J. Conrad, Ser. No. 754,233 filed Aug. 21, 1968, now U.S. Pat. No. 3,508,645 all assigned to the assignee of the present application.

BACKGROUND OF THE INVENTION

The present invention relates to the food processing art and more particularly to an apparatus for disuniting soft edible material from harder inedible portions in composite foodstuffs.

It has long been a problem in the food processing art to mechanically disunite and separate softer edible material from harder inedible material, such as meat from bones and fruit from pits, and to effectively recover an economical proportion of the edible material. A major difficulty in this processing is to avoid crushing and mixing the inedible material with the edible meats. Also, substantially all of the meat must be separated from the inedible material without unduly damaging or reducing the edibility of the meat.

A further problem bearing on the economic practicality of the mechanical operation is the fact that in the food processing industry there is a need for constant cleanliness which requires frequent shutdown, dismantling and washing of the processing machinery.

In the past, the machinery used in disuniting and separating meat from bones and the like has consisted of hammer mills, which have often tended to crush and mix the meat with the bones during the disuniting operation, and various slicers and graters which are generally of complicated construction and of comparatively poor recovery efficiency. These prior art disuniting devices frequently require excessive shutdown time for cleaning and washing due to the difficulty of handling and dismantling them.

A recent improvement in this art is the apparatus disclosed in the copending applications of Lucas J. Conrad, Ser. No. 603,484 filed Dec. 21, 1966, now U.S. Pat. No. 3,472,300, and Conrad et al., Ser. No. 679,326 filed Oct. 31, 1967, now U.S. Pat. No. 3,514,808. This type of apparatus comprises a horizontally-arranged rotatable disc having a ribbed surface with a series of tines mounted above the surface in the form of a number of arcs extending radially outward from the axis of the disc. Pieces of the composite food are dropped between the tine arcs onto the upper surface of the disc and are moved outwardly toward the periphery by the action of the tines in cooperation with disc rotation. As the food travels outwardly, it is engaged by the tines and the soft parts, e.g. meat, are pulled away from the hard parts, the bones, by the cooperation of the tines and the ribs on the disc member.

SUMMARY OF THE INVENTION

The apparatus of the present invention comprises an improved disuniter apparatus of the type having a rotatable disc with a ribbed surface which cooperates with a series of tines mounted above the surface in the disuniting operation. This improved apparatus is cantilevered on a rollable platform or carriage for ready movement and accessibility and has the drive means supported above the disuniting section to facilitate dismantling and cleaning. In addition, the spacing and arrangement of the tines and the disc may be varied to adapt the apparatus for use with different foodstuffs.

DETAILED DESCRIPTION

Figure 1:
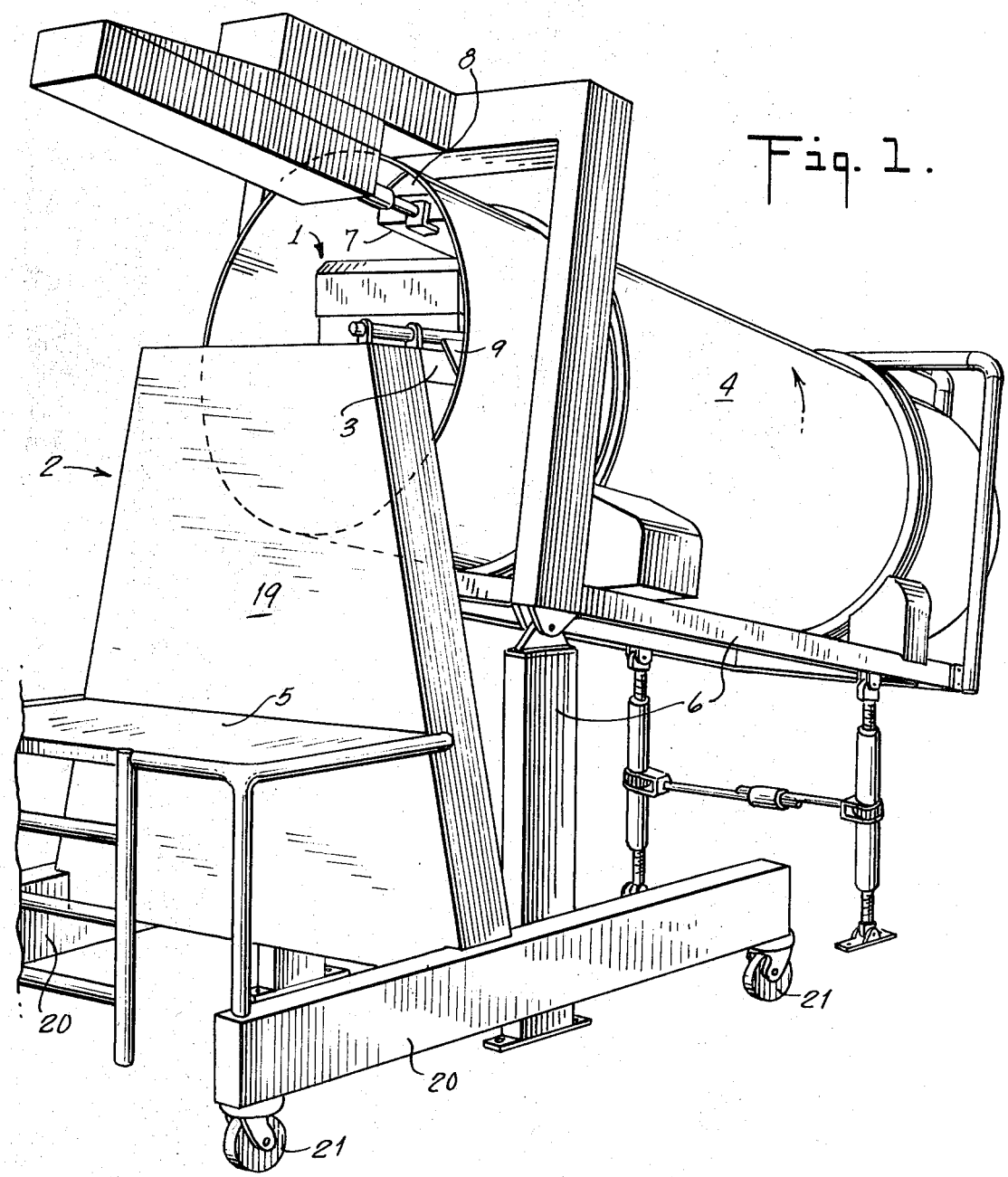
FIG. 1 is a perspective view of a food processing apparatus incorporating the present invention.

The system for disuniting and separating composite foodstuffs having edible portions and inedible portions is shown in FIG. 1. The disuniter apparatus 1 is shown supported on a carriage 2 by a cantilevered beam 3 in its operating position in the mouth of an inclined rotating separator drum 4. The foodstuffs may be introduced into the upper portion of the disuniter apparatus 1 by an operator standing on a platform 5 on the disuniter support carriage 2.

In the disuniter apparatus 1 the component food parts are disassociated and drop from the bottom onto the surface of the rotating drum 4. The generally sticky edible portions adhere to the drum's surface and are carried upwardly by it while the inedible harder parts tend to slide and remain in the bottom of the drum 4. The drum 4 is mounted on an adjustable frame 6 which permits inclining the drum axis at a suitable angle to cause the core material to slide downwardly along the drum and out the lower end into a suitable receptacle (not shown). Also mounted on the drum frame 6 is a reciprocating conveyor 7 which is positioned in the upper part of the drum 4 parallel to the drum axis. The edible portions of the foodstuffs which have adhered to the drum 4 are scraped, by scraper 8, from the drum surface above the conveyor and are dropped by gravity onto the reciprocating surface of the conveyor 7. By means of the reciprocating motion as more fully described in the previously cited copending application of Conrad et al., Ser. No. 679,326, and the inclined orientation, the edible foodstuffs are moved along the conveyor 7 and out the lower end of the drum 4 where they are recovered for further processing. An auxiliary scraper 9 is also mounted on the disuniter support carriage 2 to prevent material clinging to the drum surface from being carried upwardly and dropped onto the upper housing of the disuniter apparatus 1.

DISUNITER APPARATUS SUPPORT

Figure 2:
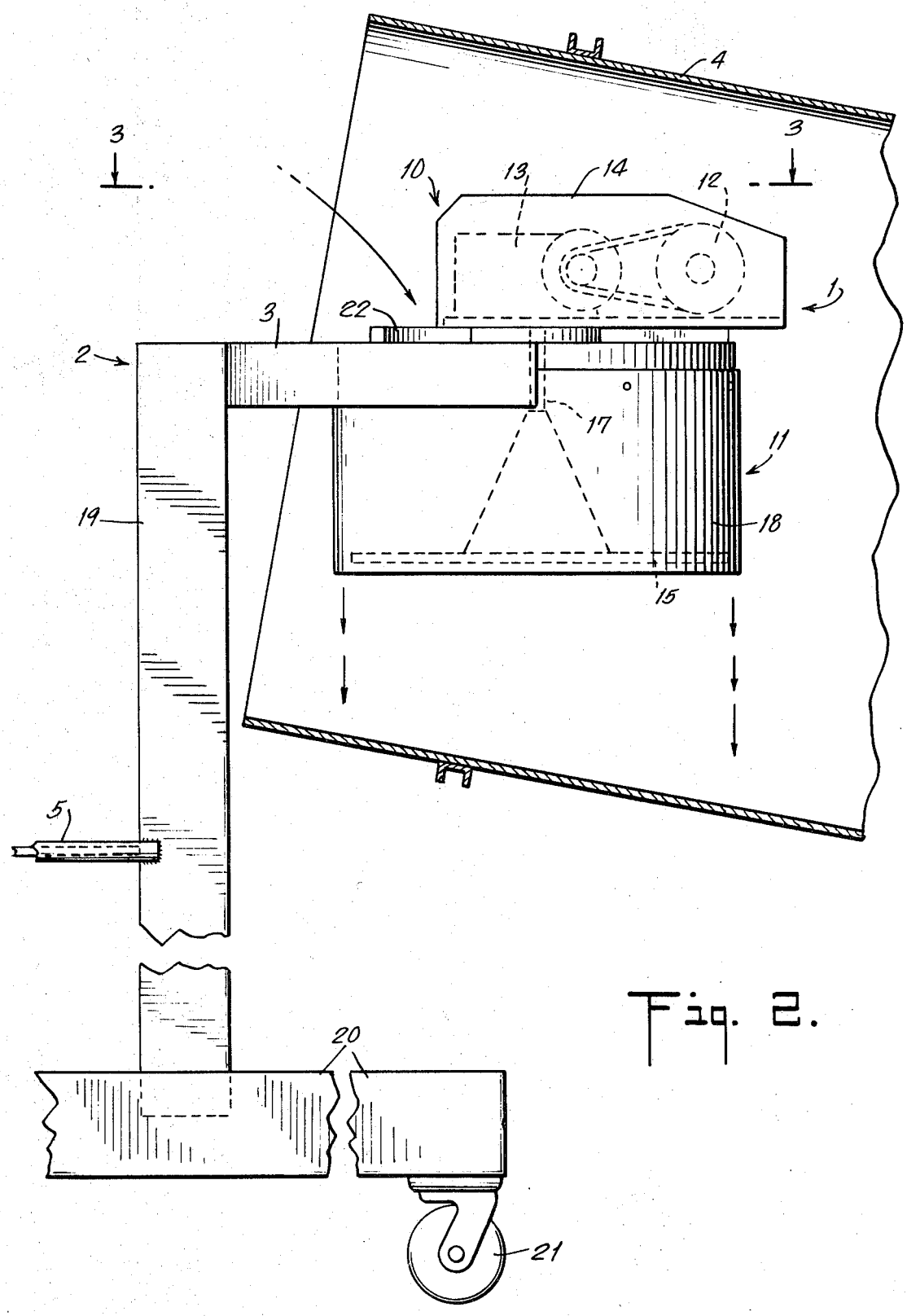
FIG. 2 is a view in elevation of the disuniter apparatus positioned in the end of the separator drum.

The disuniter apparatus 1 and support beam or arm 3 are shown in somewhat greater detail positioned in the upper end of the separator drum in FIG. 2. The frame 6, conveyor 7, and scrapers 8 and 9 have been omitted for the sake of clarity.

The disuniter apparatus 1 is constructed in two sections, an upper drive section 10 and a lower disuniting section 11. The drive section 10 comprises a motor 12 and transmission system 13 mounted within a housing 14, while the disuniting section 11 comprises a rotating disc member 15 which cooperates with a suitable series of tines 16 (FIG. 4) and has its drive shaft 17 extending upwardly into the transmission system 13. The disuniting section 11 is surrounded by an annular shield 18 which directs the disunited material falling from the periphery of the disc downwardly onto the lower surface of the separator drum 4.

The composite disuniter apparatus 1 is mounted on the support carriage 2 by means of cantilevered arm 3 which suspends it in horizontally spaced relationship from the remainder of the support structure. The support carriage 2 includes an upstanding wall member 19 which is mounted on suitable support beams 20 having castered wheels or rollers 21 thereon so that the entire disuniter device may be easily rolled to and from the end of the separator drum 4. The operator's platform 5 extends horizontally from the opposite face of the upstanding wall 19 from the cantilevered beam 3 and the disuniter apparatus 1. An operator may stand on this platform 5 and introduce the whole foodstuffs into a feed opening 22 at the top of the disuniting section 11.

It will be seen that by virtue of this improved construction and mounting that the disuniter apparatus 1 is readily transportable for use with many different types of separator apparatus and may be easily withdrawn from the separator drum shown in FIGS. 1 and 2 for cleaning and maintenance. Also by virtue of the cantilevered suspension, the parts of the apparatus are spaced from the surrounding structure and readily accessible for the performance of these functions. These and other functions are further facilitated by the additional constructional features which will now be described.

Figure 3:
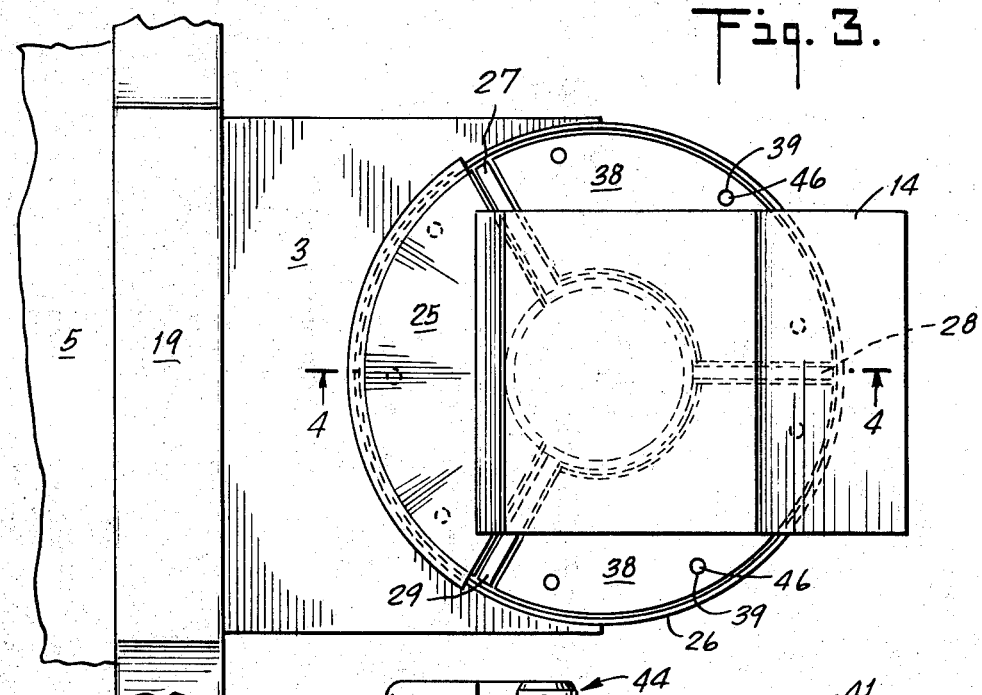
FIG. 3 is a top view of the disuniter apparatus taken along the lines 3-3 in FIG. 2.
Figure 4:
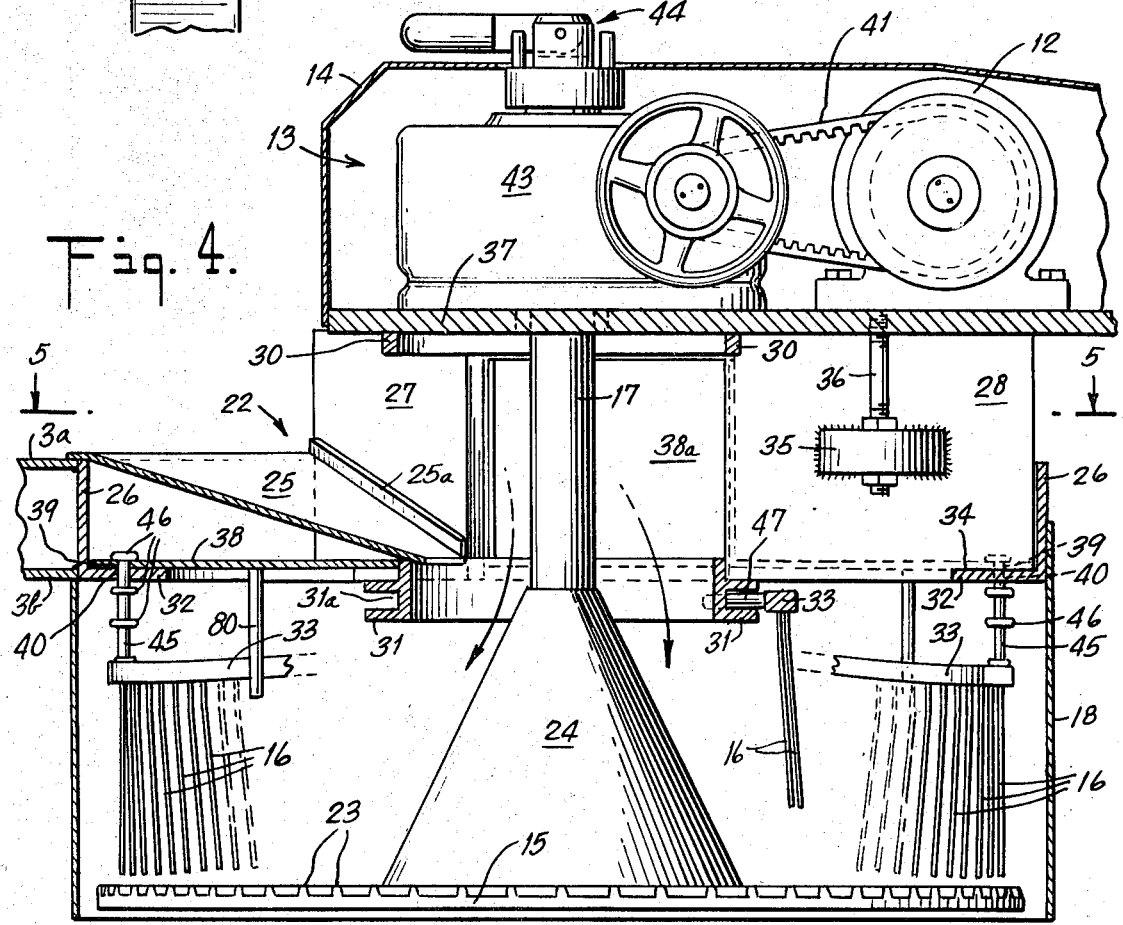
FIG. 4 is a sectional view of the disuniter apparatus taken along the lines 4-4 in FIG. 3.
Figure 5:
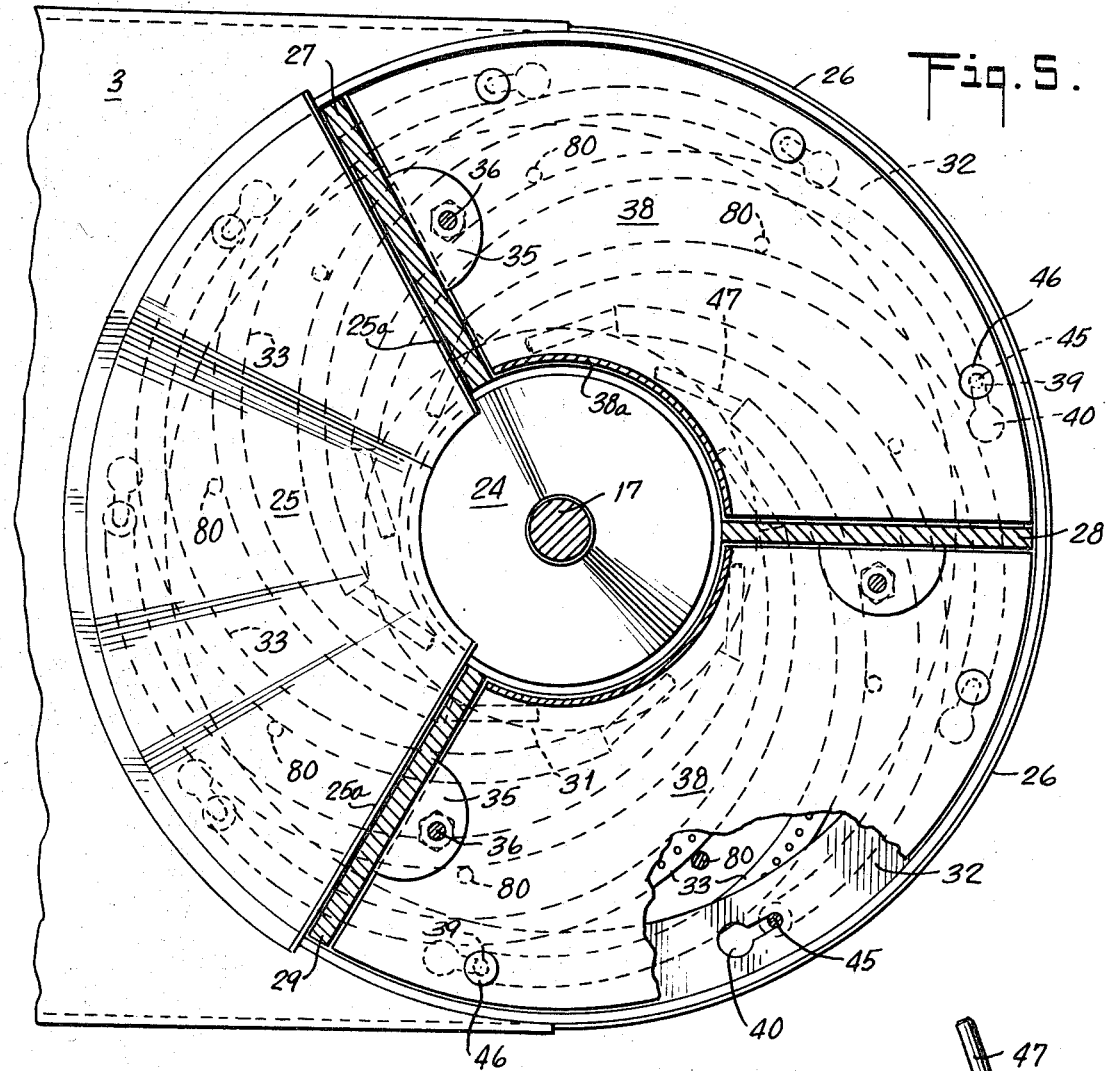
FIG. 5 is a top view of the disuniting section of the disuniter apparatus taken along the lines 5-5 in FIG. 4.
Figures 6, 7:
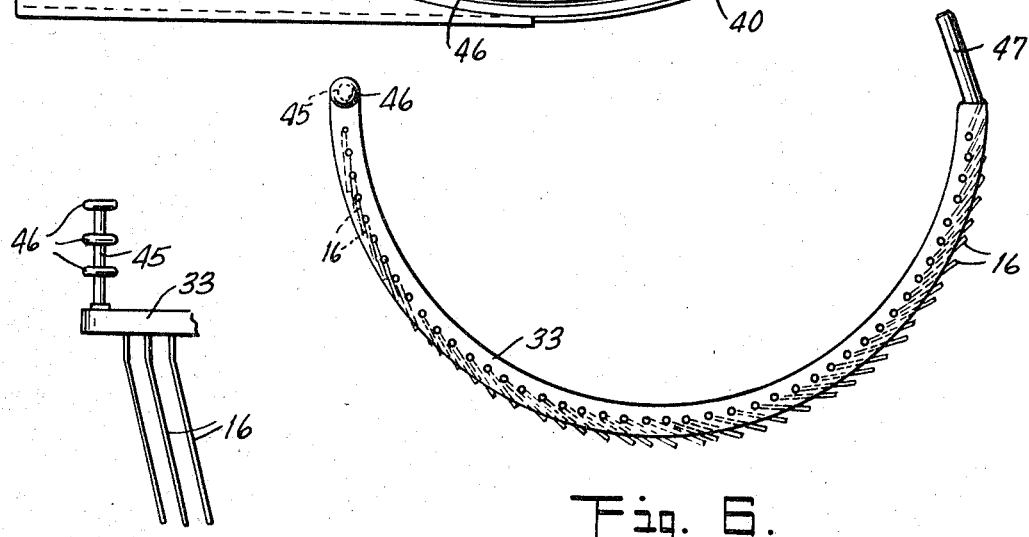
FIG. 6 is a top view of a tine support ring which is used in the disuniting section of the of the improved apparatus.
FIG. 7 is a view in elevation of the left-hand end of the tine support ring shown in FIG. 6.

The particular construction of the disuniter apparatus 1 is shown more fully in FIGS. 3, 4, and 5. The disuniting mechanism 11 is shown in the lower portion of FIG. 4 and comprises the horizontally oriented disc member 15 having radial ribs 23 formed on its upper surface. The disc member 15 is fixed on the axial drive shaft 17 for rotation therewith. The shaft 17 carries a conical housing member 24 on its lower end at the surface of the disc. The conical member 24 acts to guide the foodstuffs, introduced from a feed pan 25, onto the peripheral surface of the disc 15. A series of tines 16 are mounted on support rings 33 above the ribbed surface of the disc member 15 and coact with it in stripping the edible material, such as chicken meat, from the inedible portion of the foodstuff, such as the bones. The disuniting action is more fully described in the previously cited copending application of Conrad et al. Ser. No. 679,326, filed Oct. 31, 1967 and assigned to the assignee of the present application.

The support structure for the disuniter apparatus comprises the cantilever arm 3 and an outside ring member 26 mounted on the end of arm 3; three vertical, radially inwardly extending spacer plates 27, 28 and 29 supported by flange 32 on outside ring 26; and a top ring 30 and a bottom ring 31 attached to the inner ends of the spacer plates. The cantilever arm 3 which may be in the form of parallel plates 3a and 3b, as shown in FIG. 4, has the outside ring member 26 attached to its end as by welding. The lower inwardly extending flange 32 on the outside ring member 26 acts as a tine ring hanger and as the chief support for the remainder of the disuniter apparatus.

While the members 26, 30 and 31 are shown and described as circular rings, it should be understood that the use of the term "ring" throughout this application is meant to comprehend any member having a central opening therein irrespective of its par peripheral configuration, whether circular or polygonal. The bottom ring 31 supports the inner ends of the tine rings 33 while the outer ends are supported by the outside ring flange 32. The ring 31 is fastened along with the top ring 30 as by welding to the three upstanding side spacer plates 27, 28 and 29. The side spacer plates are adapted by small cutouts 34 at their lower edges to seat on the outside ring flange 32 with the top ring 30 and bottom ring 31 surrounding the disc drive shaft 17. Each of the three spacer plates 27, 28 and 29 has a mounting block 35 fastened to one vertical face. Each block 35 accommodates a bolt 36 for anchoring a motor base plate 37 which is supported on the upper edges of the spacer plates.

Three cover plates 38 are disposed above the space between the outside ring flange 32 and the bottom ring 31 with their peripheral edges resting on the upper surfaces of the flange 32 and ring 31. The outer peripheries of the cover plates 38 are provided with circular apertures 39 (FIG. 5) which cooperate with matching keyhole slots 40 in the flange 32 to receive and lock tine level adjusting pins 45. Downwardly extending pins 80 on the underside of the plates 38 hold the tine rings 33 in place with the inner support pins 47 in groove 31a on bottom ring 31.

The cover plates 38 act to close the upper part of the disuniting section 11 to prevent foreign objects or contaminants from entering the disuniting mechanism. The feed pan 25 is mounted above one of the cover plates 38 with one end resting on the cantilever arm 3 and its lower end resting on the bottom ring 31. The foodstuff is introduced by the operator or mechanical means along this pan 25 into the disuniting mechanism, entering through the annular opening within the bottom ring 31 as indicated by the arrows in FIG. 4. The guide cone member 24 will direct the foodstuff toward the outer periphery of the ribbed disc member 15. As it travels outwardly, it is engaged by the tines 16, and the soft parts, e.g. meat, are pulled away from the hard parts of the bones, by the cooperation of the tines 16 and the ribs on the disc member 15. Guard rails 25a and upstanding walls 38a on the two cover plates opposite the feed pan 25 also help to direct the foodstuffs along the proper path. The annular shield plate 18 is attached to the outer surface of the outside ring member 26 and surrounds the disuniting portion 11 of the apparatus directing the conglomerate disunited food parts falling from the periphery of the disc 15 to drop directly beneath the apparatus.

The means for driving the disuniter disc 15 is mounted on the base plate 37 supported on the top edges of the spacer plates 27, 28 and 29. The drive means as shown in FIG. 4 comprises the motor 12 which is connected by means of a belt 41 to drive gearing within a drive gearbox 43. This gearing when driven rotates the disuniter disc drive shaft 17 thereby rotating the disc member 15 to perform the disuniting operation. The upper end of the drive shaft is attached to means 44, shown on top of the drive gearbox 43, which may be used for adjusting the level of the disc member 15 with respect to the lower ends of the tines 16. This adjusting means 44 is shown and described in greater detail with reference to FIG. 8. The drive section of the apparatus is sealed by the housing 14.

TINE RING MOUNTING

As perhaps best seen with red reference to FIGS. 5—8, the level of the tine rings 33 within the disuniting portion 11 of the apparatus also may be varied by virtue of the cooperation of the tine ring hanger structure and the tine level adjusting pins 45. The tine ring hanger structure, which consists of the outside ring flange 32 and the overlying cover plate 38, with their respective cooperating keyhole slots 40 and circular apertures 39 acts to support any of a number of stops 46 formed on the adjusting pin 45. The stops may be in the form of protuberances 46 as shown or may be grooves in a pin of larger diameter.

The pin 45 is attached at one end of and to the upper surface of the substantially semicircular tine ring 33. The opposite end of the ring 33 is provided with a laterally extending pin 47 which fits into a peripheral slot 31a in the bottom ring member 31. When the respective pins 45 and 47 are in place on the outside ring flange 32 and the bottom ring 31, the cover plates are put in place. The apertures 39 fit over the stops 46 on the pins 45 locking the pins against movement in the keyhole slots 40. Downwardly extending pins 80 on the underside of the plates 38 hold the rings 33 against outward movement and maintain the pin 47 in the groove 31a. When all the tine rings 33 are in place each tine ring 33 will have a curvature which in cooperation with the other tine rings creates a pinwheel formation of radially extending curved tine members 16 above the rotating disuniter disc member 15 as shown in FIG. 5. Since the level of the inner ends of the tine rings 33 are fixed with the level of the bottom ring 31, the inclination of the lower ends of the tines 16 with respect to the disc member 15 may be varied by altering the particular stop 46 selected on the adjusting pin 45 for insertion in the tine ring hanger openings 39 and 40.

DISC LEVEL ADJUSTMENT

Figure 8:
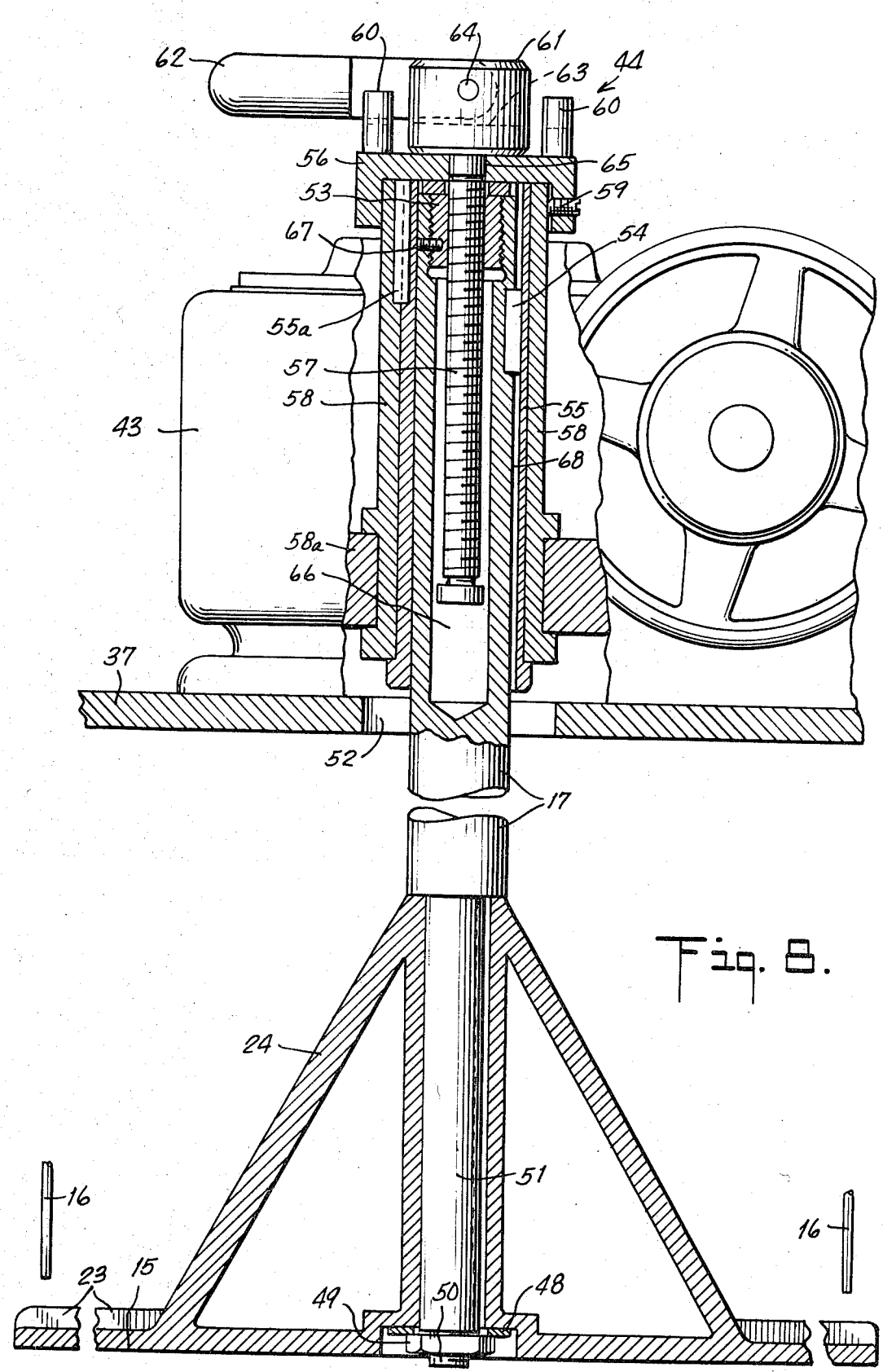
FIG. 8 is a view partly in section and partly broken away showing the structural detail of the means for varying the level of the ribbed disuniting disc.

The improved mechanism for mounting and adjusting the height of the disuniter disc is shown in detail in FIG. 8. The disc member 15 with its guide cone 24 is mounted on drive shaft 17 by means of a washer 48 and nut 49, which screws onto a threaded stud 50 on the lower end of the reduced diameter shaft extension 51. The guide cone 24 may be constructed integrally with the disc member 15, as shown, or constructed as a separate piece. The drive shaft 17 extends upwardly through an opening 52 in the motor baseplate 37 and into drive gearbox 43. The upper end of the shaft 17 is internally threaded to accommodate a nut 53 which supports it in the mounting structure. The upper portion of the shaft 17 is also provided with a key 54 which connects it with a bushing 55. Bushing 55 is fixed by key 55a to a sleeve member 58 which fits within and is connected to move with drive gear 58a. The drive gear 58a the drive torque from the transmission and supports the disc shaft 17 and its mounting mechanism on the gearbox trust bearing (not shown).

The shaft mounting mechanism consists of a cap member 56, a threaded rod 57, the mounting nut 53, sleeve member 58 and the bushing 55. The cap member 56 is supported by and attached to the sleeve member 58 above the gearbox 43 by setscrew 59. The cap member 56 supports top member 61 which has the upper end of the threaded rod 57 fastened, as by welding, to its underside and is grooved on its upper portion to receive a handle 62. The handle 62 is rotatably held in the groove 63 by a cross pin 64. Two stop pins 60 are provided on the upper surface of the cap member 56 to prevent rotation of the handle 62.

The threaded rod 57 held on the underside of the top member 61 extends through an aperture 65 in the cap member 61 into a bore or recess 66 in the upper portion of the drive shaft 17. The threads on the rod 57 cooperate with internal threads on the mounting nut 53 whose outer threads cooperate with internal threading on the upper end of the drive shaft 17. A setscrew 67 holds the mounting nut 53 in position in the drive shaft 17. The entire mounting mechanism rotates with the shaft 17.

To raise raise and lower the disuniter disc member 15, the handle 62 is manually lifted to clear the stop pins 60 and is used as a crank to turn the threaded rod 57 through the intermediation of the top member 61. Rotation of the threaded rod 57 will cause the mounting nut 53 to ride upwardly or downwardly axially along its length carrying the drive shaft 17 with it. The key way 68 in the bushing 55 extends the full length of the bushing to permit a maximum adjustment range.

OPERATION

When the improved disuniting apparatus 1 is to be used, it is readily movable by rolling to the place where the disuniting operation is to be performed. It may be used in cooperation with a separator drum 4 such as shown in FIGS. 1 and 2 or with any other suitable separator means. The cantilevered support permits it to be positioned above most of the separating apparatus known in the art.

When, during its operation, it becomes necessary to clean or repair the disuniting apparatus 1, the entire unit may be readily moved from its operating position to permit access to the drive means 10 or the disuniting section 11. The drive means 10 is readily accessible by merely removing the motor housing 14 and the disuniting mechanism 11 need not be touched while adjusting, cleaning or repairing the drive means 10.

Cleaning of the disuniting section 11 is also comparatively simple in that removal of the shield member 18 gives access to all of the parts. The drive means 10 is isolated above the disuniter portion 11 so that it is not involved in the cleaning operation. The tine rings 33 may be quickly removed and reinstalled and the level of the ribbed disc member 15 may be dropped by simply rotating the adjusting means 44 for better access to the disc upper surface. The feed pan 25 is easily removed and replaced and the cover plates 38 prevent any of the foodstuffs from entering or adhering to the inner portions of the outside ring 26.

If foodstuffs of different sizes are to be processed in the machine, the inclination of the tine edges and the spacing between the edges and the ribbed surface of the disc may be easily adjusted to accommodate the various products.

It will be seen that all of the necessary adjustment, maintenance and cleaning operations may be performed without the obstruction and interference of surrounding structures thereby permitting greater speed and efficiency in performing these functions.

An improved apparatus and structure is thus disclosed for disuniting and processing various foodstuffs which permits ready adjustability of the parts to adapt them for gentle and efficient treatment of the materials being processed and which permits simple and rapid handling and dismantling of the composite machinery facilitating cleaning and washing and significantly reducing shutdown and maintenance time.

We claim:

1. Apparatus for disuniting the components of composite food pieces of the type having:
    a. a substantially horizontal disc member with radial ribs on its upper surface;
    b. a series of tines in the form of radially extending curves with their lower ends spaced from the upper surface of the disc member; and
    c. drive means for producing relative rotation between said disc and said tines;
wherein the improvement comprises:
    d. means suspending said disc member below said drive means and the lower end of said tines, said suspending means being connected to and rotatable by said drive means and including means for varying the level of said disc member with respect to the lower ends of said tines; and
    e. mounting means including a cantilevered arm supporting said drive means and said tines in spaced relation from the remainder of said mounting means so as to suspend said drive means, said tines and said disc member remotely from said mounting means permitting unencumbered access thereto.

2. Apparatus as claimed in claim 1 wherein said means suspending said disc member comprises:
    f. a rotatable shaft having said disc member attached to one end and a recess in its opposite end;
    g. a threaded rod adapted to fit within said recess;
    h. an internally threaded nut cooperating with the threads on said rod and fixedly mounted in said recess; and
    i. means attached to the recessed end of said rod for rotating the rod with respect to said nut and shaft whereby said rod and shaft are axially displaced, displacing said disc member with respect to said rod and the lower ends of said tines.

3. Apparatus as claimed in claim 2 comprising means for mounting the recessed end of said rod on said drive means.

4. Apparatus as claimed in claim 1, comprising a top ring and a bottom ring supported by said cantilevered arm, said top ring and said bottom ring defining a passage accommodating the means for suspending said disc member and said bottom ring defining an opening for the introduction of food pieces to the super upper surface of said disc member.

5. Apparatus as claimed in claim 1 comprising shield means attached to said cantilevered arm and surrounding said disc member.

6. Apparatus for disuniting the components of composite food pieces of the type having:
    a. a substantially horizontal disc member with radial ribs on its upper surface;
    b. a series of tines in the form of radially extending curves with their lower ends spaced from the upper surface of the disc member; and
    c. drive means for producing relative rotation between said disc and said tines;

wherein the improvement comprises:
- d. mounting means including cantilevered means for supporting said drive means;
- e. means connected to said drive means for suspending said disc member therefrom;
- f. a plurality of curved members for mounting said series of tines; and
- g. an upstanding pin member at one end of each of said curved members, said pin member having a plurality of stops along its length, said cantilevered means having apertures accommodating the passage of said pin members and selectively supporting said stops to adjust the level of said tines with respect to said disc member.

7. Apparatus as claimed in claim 6 comprising cover means supported by said cantilevered arm, said cover means having apertures therein accommodating the passage of said pin members and surrounding the stops which are selectively supported by said cantilevered means thereby locking the pin members against movement in the apertures in said cantilevered arm.

8. Apparatus as claimed in claim 7 comprising a bottom ring supported by said cantilevered means and having a peripheral groove therein, a second pin member on each of said curved members extending laterally from the end opposite that having said upstanding pin member, said second pin members riding in said groove, and a series of third pin members on said cover means and abutting said curved members thereby holding said lateral pin members in said groove.